US007218370B2

(12) United States Patent
Segawa et al.

(10) Patent No.: US 7,218,370 B2
(45) Date of Patent: May 15, 2007

(54) DISPLAY DEVICE

(75) Inventors: Yasuo Segawa, Gifu (JP); Masaaki Aota, Ogaki (JP); Tsutomu Yamada, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 129 days.

(21) Appl. No.: 10/705,222

(22) Filed: Nov. 12, 2003

(65) Prior Publication Data

US 2004/0145694 A1 Jul. 29, 2004

(30) Foreign Application Priority Data

Nov. 11, 2002 (JP) ............................ 2002-326413

(51) Int. Cl.
*G02F 1/1339* (2006.01)
*G02F 1/1343* (2006.01)

(52) U.S. Cl. ...................................... 349/149; 349/139

(58) Field of Classification Search ........ 349/149–152, 349/139

See application file for complete search history.

(56) References Cited

U.S. PATENT DOCUMENTS 5,393,996 A 2/1995 Lang .......................... 257/210
5,781,253 A * 7/1998 Koike et al. .................. 349/40
5,805,246 A * 9/1998 Lee et al. ...................... 349/40
6,190,934 B1 * 2/2001 Kang et al. .................... 438/30
6,211,534 B1 4/2001 Matsumoto .................. 257/59
6,774,398 B2 * 8/2004 Jang et al. ..................... 257/59
2004/0051836 A1 * 3/2004 Jung et al. .................. 349/149

FOREIGN PATENT DOCUMENTS

| | | |
|---|---|---|
| EP | 0 621 634 | 3/1994 |
| EP | 0 772 073 | 10/1996 |
| JP | 6-175103 | 6/1994 |
| JP | 8-114814 | 5/1996 |
| JP | 9-73102 | 3/1997 |
| JP | 10-115839 | 5/1998 |
| KR | 10-0239140 | 1/2000 |

* cited by examiner

*Primary Examiner*—Dung T. Nguyen
(74) *Attorney, Agent, or Firm*—Morrison & Foerster LLP

(57) ABSTRACT

A gate line is severed before the gate line reaches an Output portion of a vertical driving circuit of a display device, and the separated gate lines are connected by a metal wiring in an upper layer. The gate line is, for example, made of molybdenum, chrome, a molybdenum alloy or a chrome alloy, and the metal is made of aluminum or an aluminum alloy. Since the gate line is severed, the voltage stored in the gate line during the manufacturing process will not be discharged to the gate wiring of the thin film transistor, preventing the break down of the gate insulating layer of the thin film transistor.

8 Claims, 11 Drawing Sheets

FIG.7A Output Portion of the Vertical Driving Circuit 130

Output Portion of the Vertical Driving Circuit 130

DISPLAY DEVICE

BACKGROUND OF THE INVENTION

1. Field of the Invention

This invention relates to a display device that has a plurality of pixels disposed in a matrix configuration, a plurality of gate lines extending in a row direction, and a driving circuit sequentially supplying a gate scanning signal to each of the gate lines, especially to a display device with improved image quality.

2. Description of the Related Art

FIG. 10 is a diagram of a conventional liquid crystal display device. A liquid crystal panel 100 has a plurality of pixels formed in a matrix configuration of n-rows and m-columns. Each of the pixels has a pixel selecting thin film transistor 10, a liquid crystal LC, and a storage capacitor Csc. The thin film transistor will be referred to as TFT hereinafter.

A gate line 20 extending in a row direction is connected to the gate of the TFT 10, and a data line 22 extending in a column direction is connected to the drain of the TFT 10. A gate scanning signal is sequentially supplied from a vertical driving circuit (V drive circuit) 130 to the gate line 20 of each row, and the TFT 10 is selected accordingly. Also, a video signal is applied to the liquid crystal LC through the TFT 10 based on a drain scanning signal supplied from a horizontal driving circuit (H drive circuit) 140.

Japanese Patent Application Publication No. Hei 10-115839 discloses a liquid crystal display device with the above configuration.

However, a gate insulating layer of the TFT in the output portion of the gate scanning signal of the vertical driving circuit 130, sometimes suffers from a break down and leakage due to static charge induced during the TFT manufacturing process of the conventional liquid crystal display device. This kind of trouble will be explained by referring to FIG. 11A and FIG. 11B. FIG. 11A and FIG. 11B are enlarged view of part B encircled by the dotted line in FIG. 10. These figures show the pattern of the edge of the gate line 20 as well as the output portion of the vertical driving circuit 130. FIG. 11A is a plan view, and FIG. 11B is a cross-sectional view along with the X—X line in FIG. 11A.

A dry-etching method is employed for processing the gate line 20, a storage capacitor line 21, and a gate wiring in the vertical driving circuit 130. Static charge is induced and stored in the gate line 20, the storage capacitor line 21, and the gate wiring during the dry-etching process. When the ion implantation of an N-type impurity such as arsenic or phosphorus into a P-Si layer, or the ion implantation of a P-type impurity such as boron in case of P-type channel TFT, is performed for forming a source region and a drain region using the gate line 20 as a mask, static charge is also stored in the gate line 20, the storage capacitor line 21, and the gate wiring due to the charge-up phenomena. It is especially easy for the gate line 20 and the storage capacitor line 21 to store static charge because they extend across the liquid crystal panel 100.

The stored charge is discharged from the edge of the gate line 20 to the gate wiring 13 of the TFT 1 located close to the gate line 20. The charges from the discharge will reach a gate electrode of an adjacent TFT 2 through the gate wiring 13, causing a dielectric break down and leakage at part A of the gate insulating layer 12 of the TFT 2-1. In the figure, the reference numeral 40 indicates a transparent insulating substrate, the reference numeral 11 denotes an active layer (poly-silicon layer) disposed on the transparent insulating substrate 40, and the reference numeral 14 indicates an aluminum wiring layer. FIG. 11B is a cross-sectional view of the device before the aluminum wiring layer 14 is disposed.

SUMMARY OF THE INVENTION

The invention provides a display device that includes a plurality of pixels disposed in a matrix configuration, a plurality of gate lines extending in a direction, and a driving circuit supplying a gate scanning signal to the gate lines. Each of the pixels is selected according to the gate scanning signal. At least one of the gate lines comprises a first gate line and a second gate line, and a metal wiring connects the first and second gate lines and is located near an output portion of the vertical driving circuit. The metal wiring is formed at a processing step different from a processing step of forming the gate lines.

The invention also provides a display device that includes a plurality of pixels disposed in a matrix configuration, a plurality of gate lines extending in a row direction, a plurality of date lines extending in a column direction, a vertical driving circuit supplying a gate scanning signal to the gate lines, and a horizontal driving circuit generating a drain scanning signal for controlling a timing of supplying a video signal to the date lines. In this configuration, a gate wiring supplying a signal to at least two thin film transistors that are disposed in the vertical driving circuit or in the horizontal driving circuit comprises at least two wiring lines, and the wiring lines are connected by a metal wiring that is formed at a processing step different from a processing step of forming the gate wiring. Or, a gate wiring supplying a signal directed to a plurality of active layers that are formed in the vertical driving circuit or in the horizontal driving Circuit comprises a plurality of wiring lines, and the wiring lines are configured so as to be in contact with only one corresponding active layer and are connected by a metal wiring that is direct formed at a processing step different from a processing step of forming the gate wiring. Or, an active layer receiving a plurality signals from corresponding gate wirings and disposed in the vertical driving circuit or in the horizontal driving circuit comprises at least two active layer portions, and the active layer portions are connected by a metal wiring. Or, all the gate wirings in the vertical driving circuit or the horizontal driving circuit in direct contact with only one corresponding active layer.

BRIEF DESCRIPTION OF THE DRAWINGS

FIGS. 7A and 7B are diagrams of the output portion of the vertical driving circuit of the liquid crystal display device of the second embodiment.

DETAILED DESCRIPTION OF THE INVENTION

Figure 1:
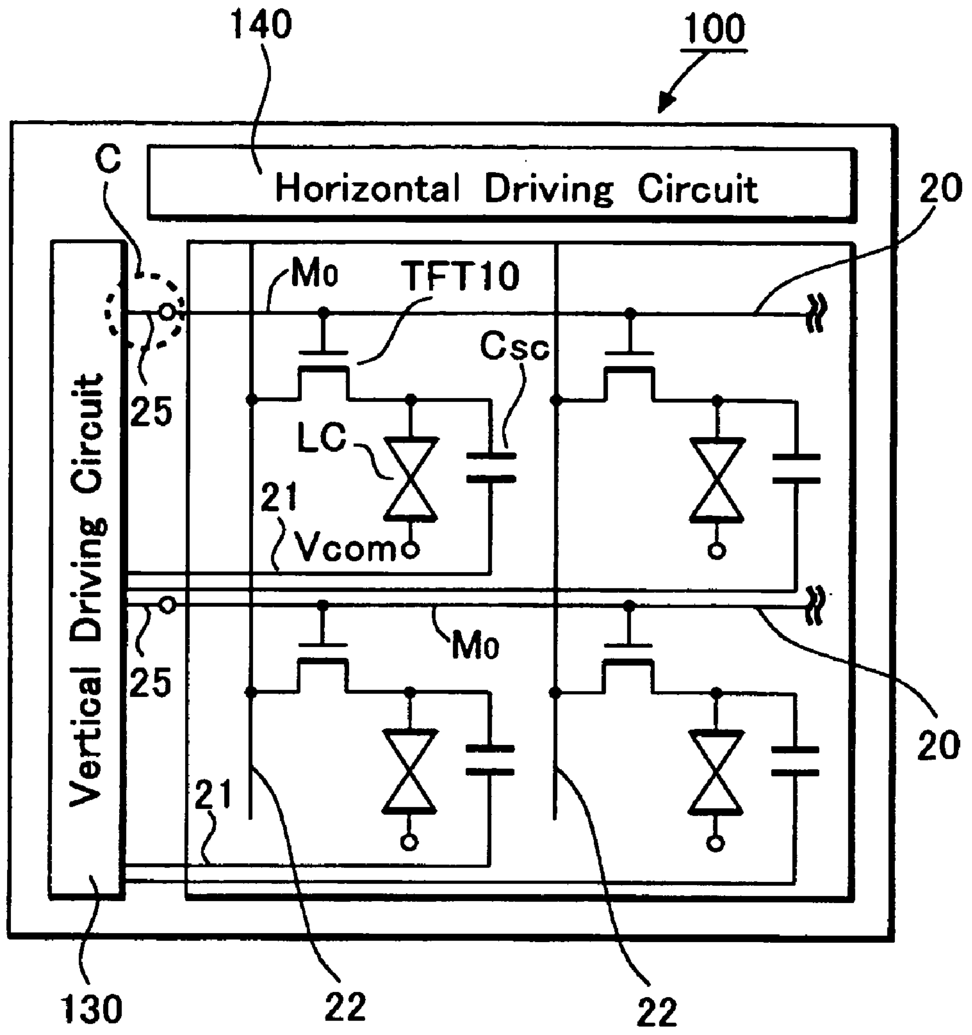
FIG. 1 is a circuit diagram of a liquid crystal display device of a first embodiment of this invention.
Figure 10:
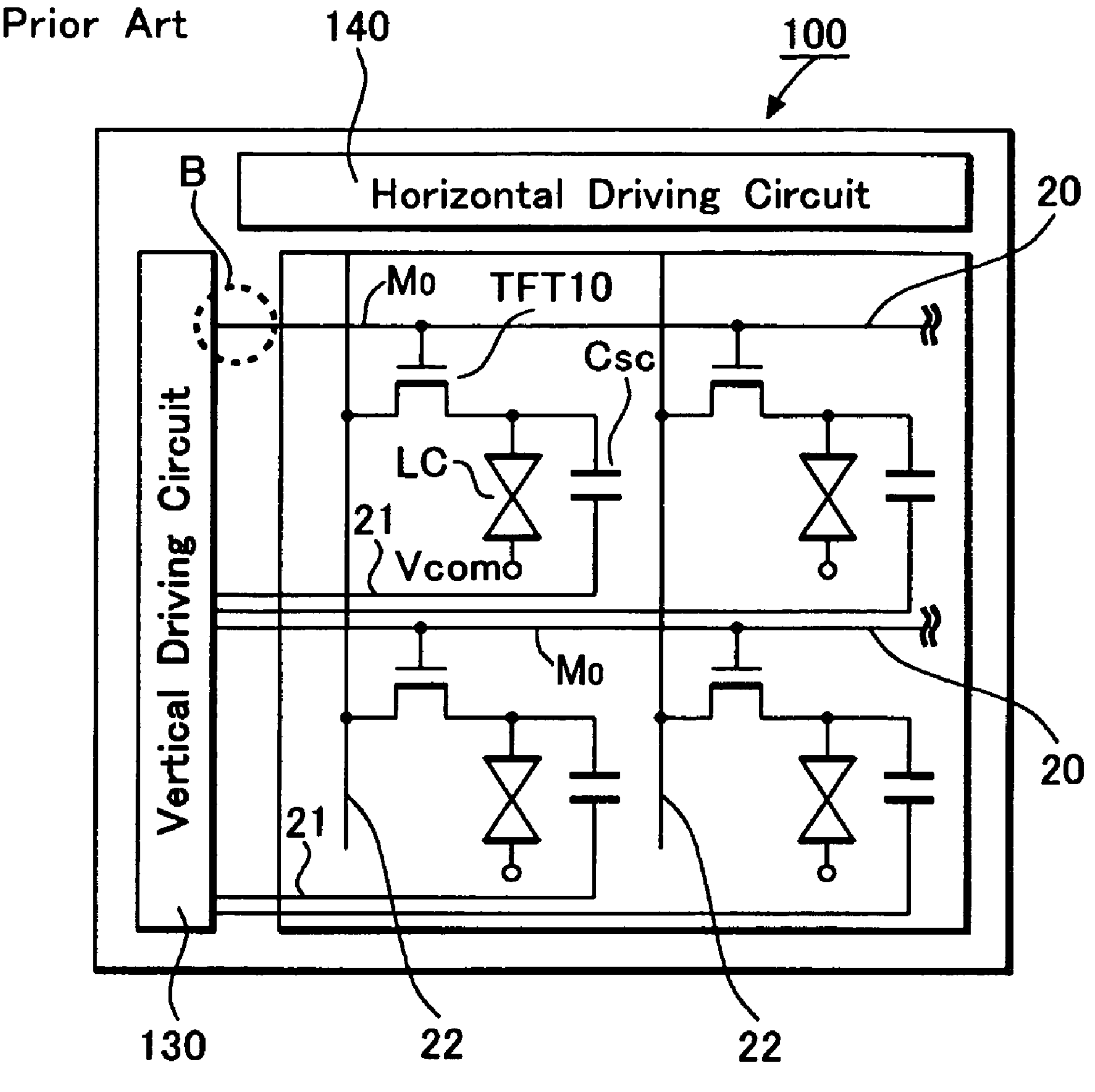
FIG. 10 is a diagram of a conventional liquid crystal display device.

FIG. 1 is a diagram of a liquid crystal display device of a first embodiment of this invention. The same components as those shown in FIG. 10 have the same reference numerals, and the explanation of those components will be omitted. In this liquid crystal display device, a gate line 20 is severed near the output portion of a vertical driving circuit 130, and the separated gate lines 20, 20 are connected by a metal wiring 25 located in an upper layer (part C encircled by the dotted line in FIG. 1).

The gate line 20 is made of, for example, molybdenum (Mo), chrome (Cr), Mo alloy or Cr alloy, and the metal wiring 25 is made of aluminum or aluminum alloy.

Figures 2A, 2B:
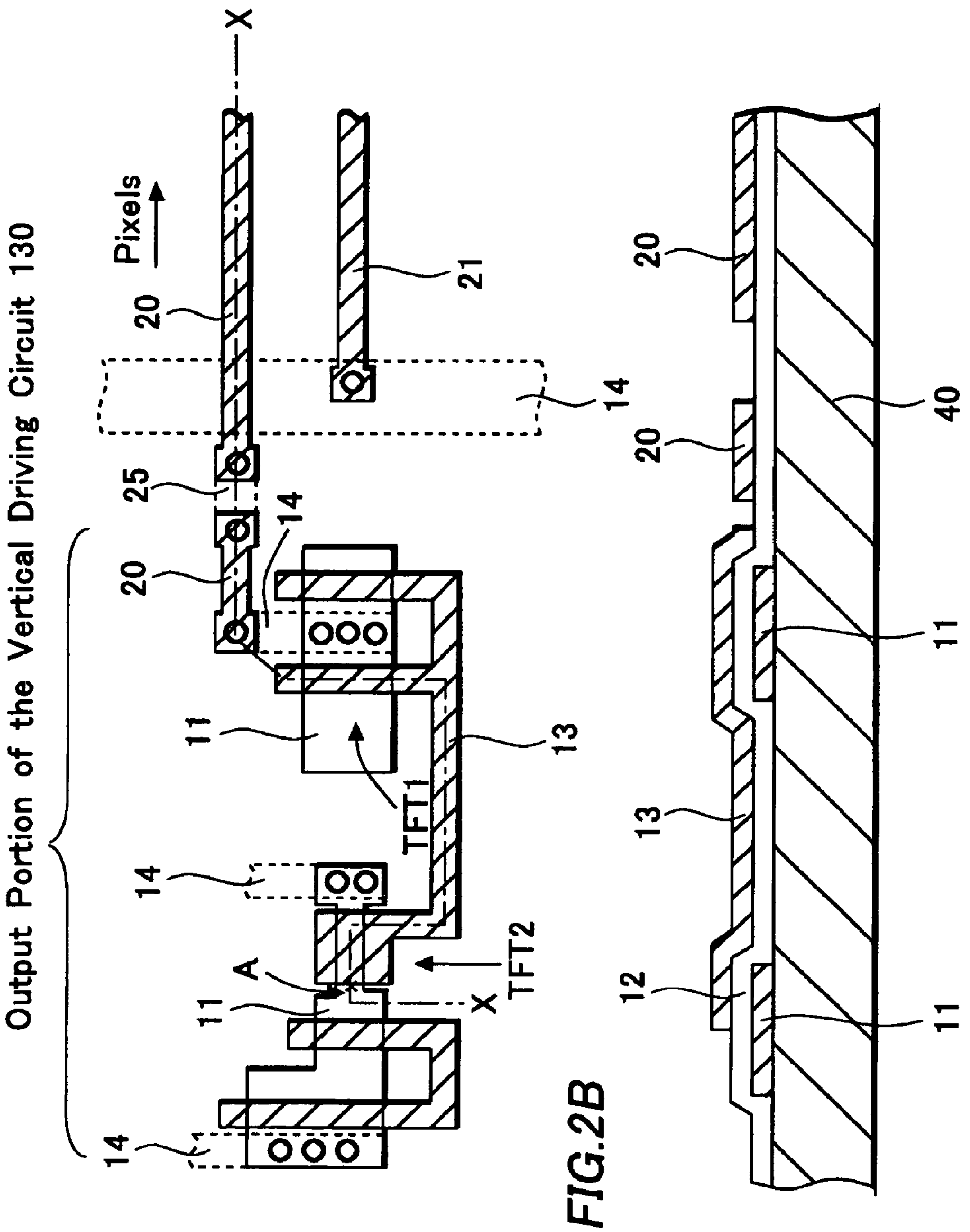
FIGS. 2A and 2B are diagrams of an output portion of the vertical driving circuit of the liquid crystal display device of the first embodiment.

FIG. 2A and FIG. 2B are enlarged views of part C in FIG. 1. These figures show the patterns of the edge of the gate line 20 and the output portion of the vertical driving circuit 130. FIG. 2A is a plan view, and FIG. 2B is a cross-sectional view along X—X line in FIG. 2A.

Since the gate line 20 is severed, the voltage stored in the gate line 20 during the manufacturing process of the liquid crystal display device will not be directly discharged to a gate wiring 13 of a TFT 1. Therefore, the break down of a gate insulating layer 12 of the TFT is prevented.

The separated gate lines 20, 20 are both connected to the metal wiring 25 located above the gate lines 20, 20 through contact holes formed in an interlayer insulating layer (not shown in the figure).

It is preferable to have an interval of more than 10 μm between the separated gate lines 20, 20. The probability for the discharge to take place between the wirings in the same layer becomes smaller when the interval between the wirings becomes bigger. When the interval between the wirings is more than 10 μm, the probability of the electric discharge can be minimized.

If the severed edge of the gate line is located close to a pixel portion in the output portion of the vertical driving circuit, the discharge from the gate line 20 on the pixel portion side may be directed toward the gate wiring 13 of the TFT I, not toward the separated gate line 20, as seen from FIG. 2. Therefore, the location where the gate line 20 is severed ought to be apart at least 10 μm from the TFT 1 of the output portion of the vertical driving circuit for preventing this type of discharge.

With this configuration, the discharge from the gate line 20 will never directly go to the gate wiring of the TFT 1. The discharge may go to the gate line 20 first, and then be directed toward the gate wiring of the TFT 1.

The amount of charges stored in the long wiring lines such as the gate line is usually large. If this large amount of charges is directly discharged to the gate wiring of TFT, the gate insulating layer may be broken down or damaged, causing the leakage of the electric current. However, the charges stored in the shorter gate line will be much smaller in amount when the gate line is severed.

Thus, even if the charges stored in the shorter gate line are discharged to the gate wiring of the TFT, the damage to the insulating layer of the TFT will be much smaller and the possibility to cause the deterioration of the TFT will also be reduced.

Therefore, cutting the gate line into two portions, the separation of the gate line from the gate wiring of the TFT in the output portion, and the using of the shorter gate line between the longer gate line and the output portion are the effective countermeasures against the electro-static damage.

The manufacturing processes explained above includes process from forming the gate wiring to the forming of the metal wiring. Those processes are especially vulnerable to the electro-static damage because the entire surface except the gate wiring portion is covered with the insulating layer. Therefore, as a countermeasure against the electro-static damage, it is effective to separate the gate wiring during these processes and to connect the gate wirings by the metal wiring afterwards.

Next a display device of a second embodiment of this invention will be described. This embodiment prevents the electro-static break down of the gate insulating layer within the vertical driving circuit 130 and a horizontal driving circuit 140. Here, the preventive measures of the electro-static break down will be explained by using the vertical driving circuit 130 as an example. The same measures can be equally effective for the horizontal driving circuit 140.

Figure 3:
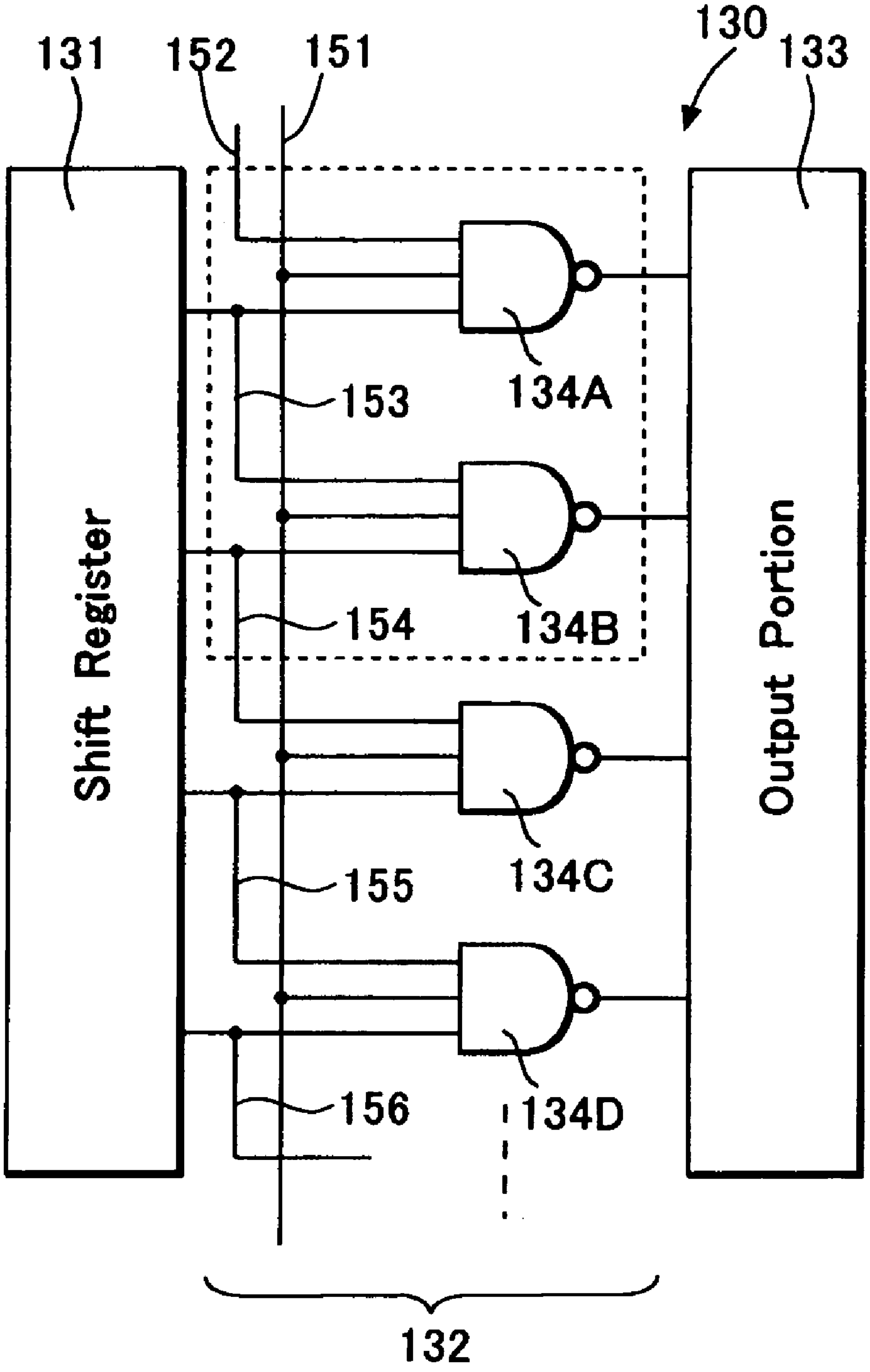
FIG. 3 is a diagram of a vertical driving circuit of a liquid crystal display device of a second embodiment of this invention.

FIG. 3 is a diagram of the vertical driving circuit 130. The vertical driving circuit 130 has a shift register 131, a two-directional scanning portion 132, and an output portion 133 that outputs a gate scanning signal to the gate line 20. The two-directional scanning portion 132 has a plurality of three-input NAND gates 134A, 134B, 134C and 134D.

A clock signal of a clock signal line 151 is commonly connected to each of the three-input NAND gates. The gate wiring 153 from the shift register 131 is connected to both the three input NAND gates 134A and 134B. A gate wiring 154 from the shift register 131 is connected to both the three-input NAND gates 134B and 134C. A gate wiring 155 from the shift register 131 is connected to both the three-input NAND gates 134C and 134D.

Figure 4:
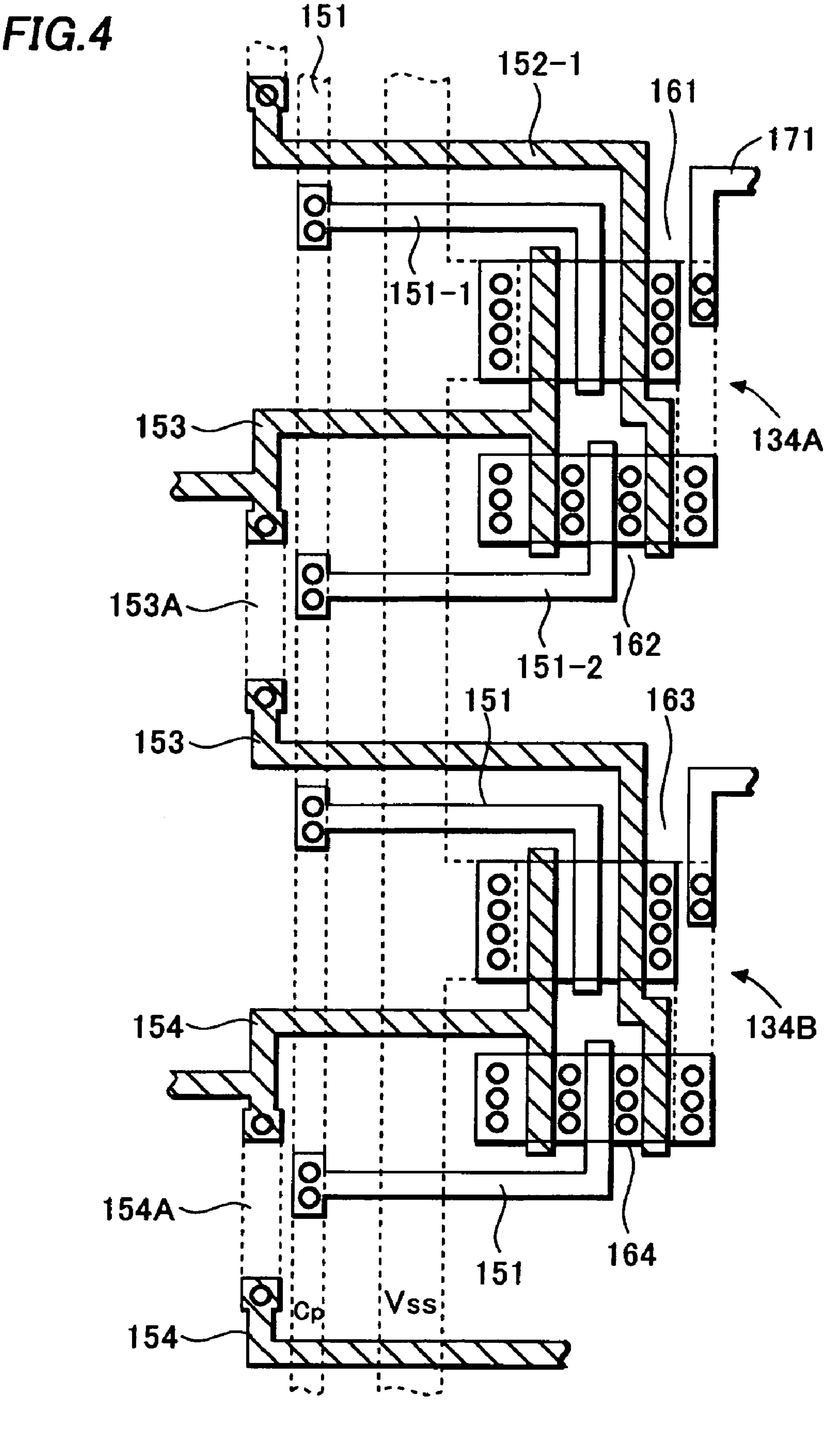
FIG. 4 shows a partial pattern of the vertical driving circuit of the liquid crystal display device of the second embodiment.

FIG. 4 shows the pattern of the portion denoted by the dotted line in FIG. 3. The gate wiring 153 commonly connected to TFTs 161, 162, which operate as the three-input NAND gate 134A, and to TFTs 163, 164, which operate as the three-input NAND gate 134B, is severed. The separated gate wirings 153 and 153 are connected by a metal wiring 153A in an upper layer.

Likewise, the gate wiring 154 is severed, and the separated gate wirings 154 and 154 are connected by a metal wiring 154A in the upper layer. The gate wirings 153 and 154 are made of, for example, molybdenum (Mo), chrome (Cr), Mo alloy or Cr alloy, and the metal wiring lines 153A and 154A are made of aluminum or aluminum alloy.

The mechanism of electro-static break down of the gate insulating layer of the TFT, where the gate wirings 153, 154 are not separated, will be explained first.

When static charge is discharged from a gate wiring 171 to a gate wiring 152-1, the closest wiring to the gate wiring 171, the break down of the gate insulating layer between a poly-silicon island (active layer) of the TFT 161 and the gate wiring 152-1 is likely to take place. When the electric potential of the poly-silicon island layer of the TFT 161 changes suddenly due to the break down, the electrical potential of the gate wirings 151 and 153, which make capacitance coupling with the poly-silicon island of the TFT 161, also changes drastically. Since the gate wiring 153 is connected to the TFT 163, there will a big discrepancy in voltage between the poly-silicon island of the TFT 163 and the gate wiring 153, damaging a gate oxide film.

When the gate wirings 153 and 154 are not separated, electro-static break down or damage will be transmitted to the adjacent poly-silicon island due to the capacitance coupling between the poly-silicon island and the gate wiring. However, it is possible to lower the amount of charges stored in one gate line and to prevent spread of the electro-static break down from one poly-silicon island to another poly-silicon island by physically separating the gate lines. The separated gate lines will be connected by the metal wiring at the final stage. However, it is effective to separate the gate wirings during the processes vulnerable against the electro-static break down.

Electro-static damage spreads when at least one of the poly-silicon islands, among a plurality of the poly-silicon islands (the gate wiring 153 is connected into four poly-silicon islands), to which a single gate line is connected, is provided with the gate signal from another gate line. In other words, when there are a plurality of poly-silicon islands connected by the single gate wiring, and when at last one of these poly-silicon islands has another gate wiring, the gate wiring should be separated. Then, the separated gate wirings should be connected by the metal wiring in the upper layer in the later process.

Each of three input signals is connected to the poly-silicon island of P-channel side and the poly-silicon island of N-channel side in the three-input NAND circuit shown in FIG. 4. Each of the gate wirings 152, 153, and 154, is connected to the two poly-silicon islands, and the gate wiring 151 is connected to each of the poly-silicon islands as an independent wiring respectively. In terms of the prevention of the electro-static damage, the gate wiring 151 is preferable.

Figure 11A:
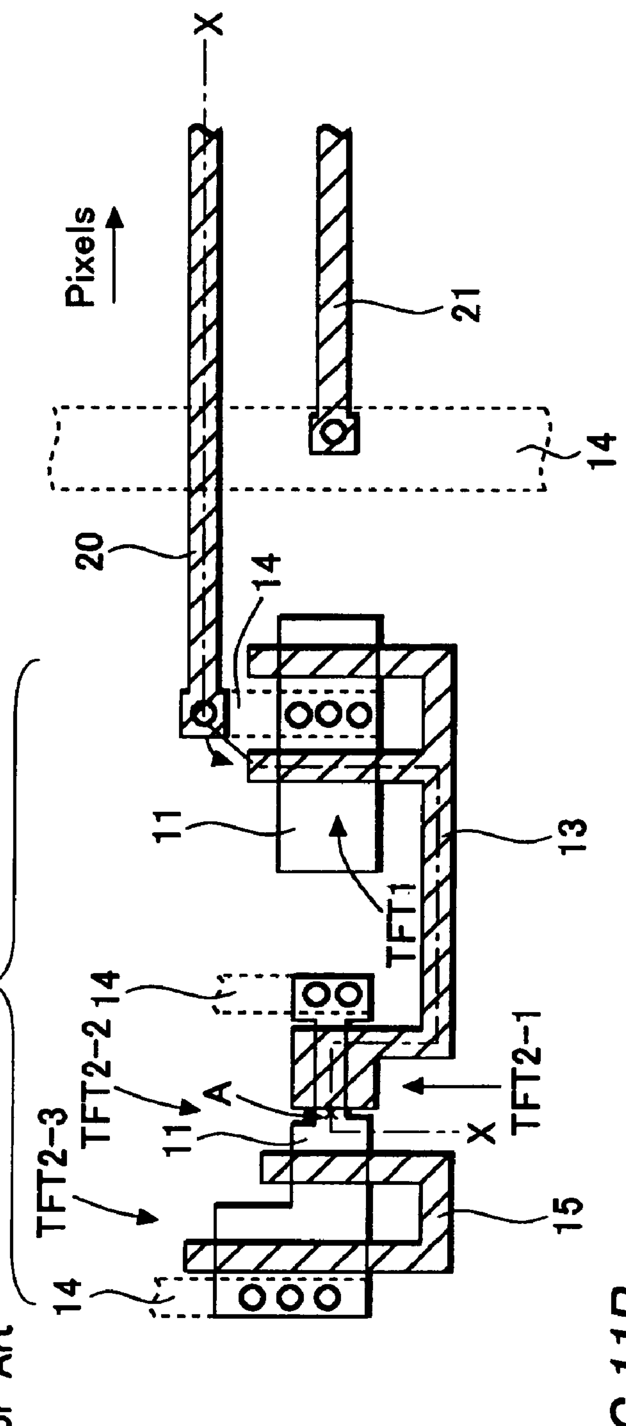
FIGS. 11A and 11B are diagrams of an output portion of the vertical driving circuit of the conventional liquid crystal display device.
Figure 11B:
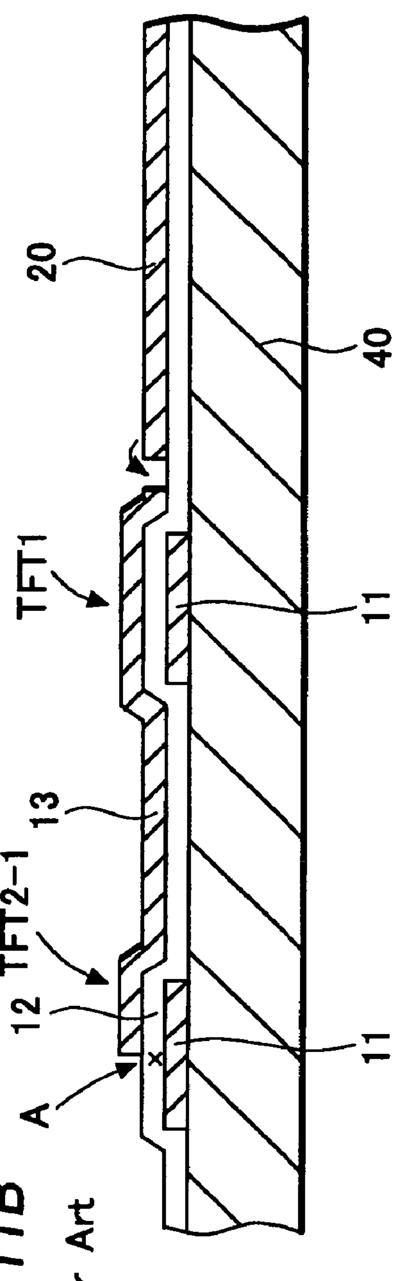

The gate wiring 13 shown in FIGS. 11A and 11B is also connected to the two poly-silicon islands. When the gate wiring is severed as shown in FIG. 7, the possibility for the static charge discharged from the gate line 20 to damage the TFT 2-1 is reduced.

The circuit in the vertical driving circuit 130 has been used as an example in the above explanation, the charges are also stored in a long gate wiring during the manufacturing process in the horizontal driving circuit 140. The same countermeasure against the electro-static damage can be taken for the horizontal driving circuit.

A large amount of charges is stored during the manufacturing process of the liquid crystal display device (the dry-etching process of the gate wiring, and the ion implantation process for forming the source region at a later stage) due to the charge-up mechanism when the device has a long gate wiring. Therefore, the gate insulating layer of the thin film transistor is likely to be damaged due to the discharge of the charge. Thus, the gate wiring should be severed for reducing the voltage due to the stored charge.

Figure 5A:
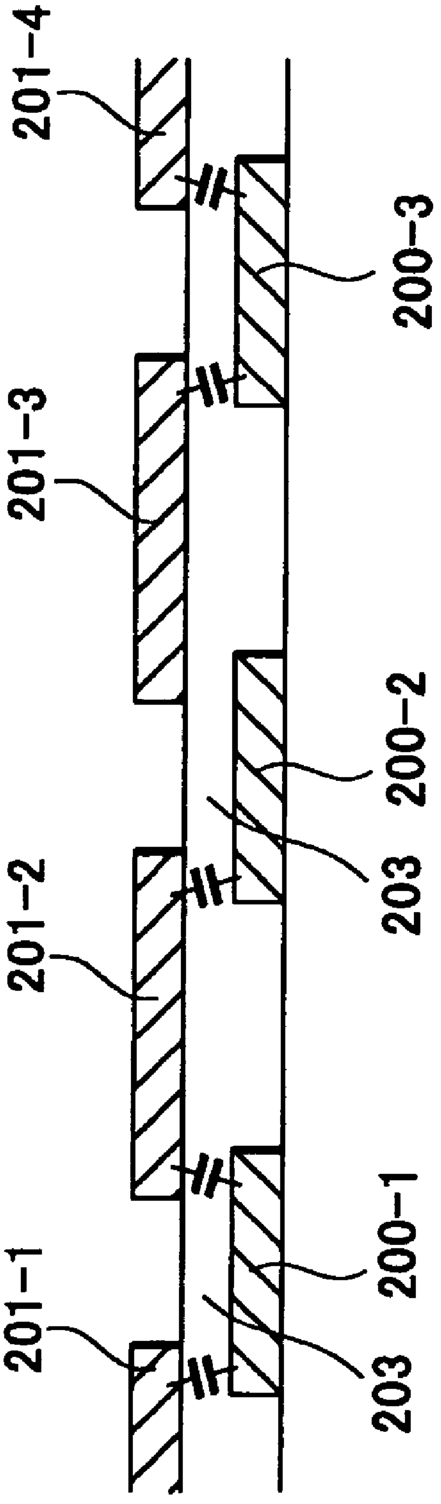
FIGS. 5A and 5B are partial cross-sectional views of the vertical driving circuit of the liquid crystal display device of the second embodiment.
Figure 5B:
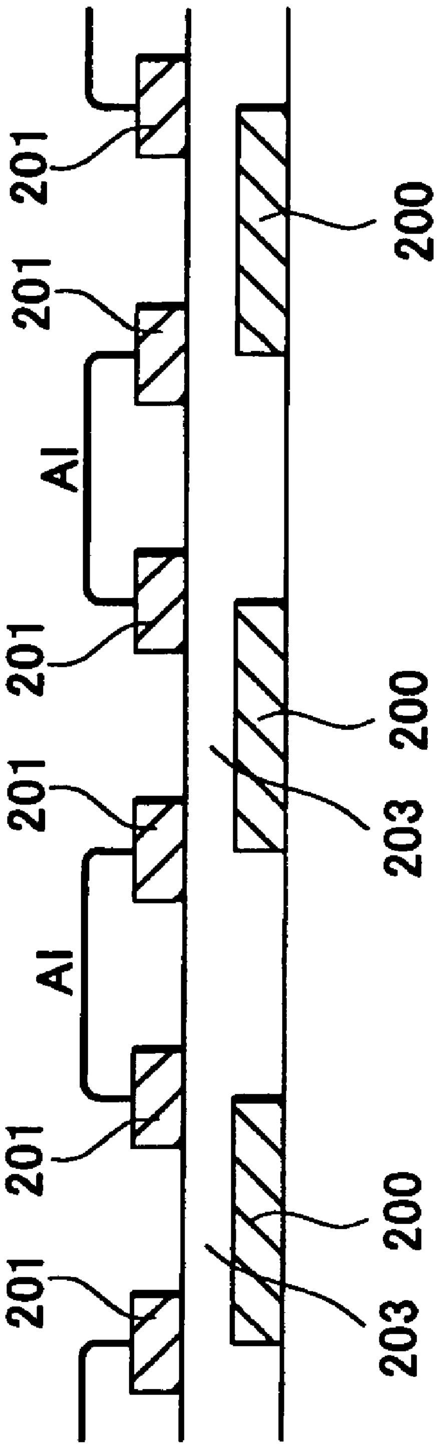

FIGS. 5A and 5B are cross-sectional views that show the concept of this embodiment. A gate insulating layer 203 is likely to be damaged by the static charge when the long gate wirings 201-1, 201-2,—extend over the poly-silicon islands 200-1, 200-2,—of the thin transistor with the gate insulating layer 203 between them, as shown in FIG. 5A.

Therefore, the gate wirings 201-1, 201-2,—are severed as shown in FIG. 5B, and the separated gate wirings are connected by an aluminum wiring in an upper layer in the later manufacturing process.

Also, the gate wirings 153, 154 are severed, as seen from FIG. 4, so that they would not be directly connected to more than two TFTs. For example, the gate wiring 153 is severed and one of the separated gate wiring is connected to the thin film transistors 161, 162 of the three-input NAND circuit 134A and another separated gate wiring is connected to the thin film transistors 163, 164 of the three-input NAND circuit 134B respectively.

In this case, the gate wiring 153 is connected directly only to two TFTs. This is the preferable configuration because the gate insulating layer of the TFT is likely to be damaged, if a single gate wiring is directly connected to many of the TFTs. The gate wiring should not be connected directly to more than three TFTs. However, it is not practical if the number of the TFT, to which the same gate wiring is connected directly, is one.

A display device of a third embodiment of this invention will be described. The first and second embodiments explained above are about the prevention of the electro-static damage due to the gate wiring. The third embodiment is about the prevention of the electro-static damage due to terms of the poly-silicon island (the poly-silicon active layer) of the TFT. The poly-silicon active layer is severed in such a way that a plurality of the different gate wirings is not connected to a single poly-silicon island in the driving circuit (both the vertical driving circuit and the horizontal driving circuit). Then, the separated poly-silicon islands are connected later by the metal wiring located in a layer above the layer of the gate wiring.

The poly-silicon islands in FIGS. 11A and 11B are part of the TFT 2-1 with the gate wiring 13 and the TFTs 2-2, 2-3 with the gate wiring 15.

When the electric discharge due to static charge is connected to the gate wiring 13, making a big change in the voltage of the gate wiring 13, the difference in the voltage between the gate wiring 15 and the gate wiring 13 becomes large. Since the poly-silicon film makes capacitance couplings with both of the gate wirings, there should be a big difference in the voltage in the insulating layer, causing the break down of the insulating layer.

Figure 8:
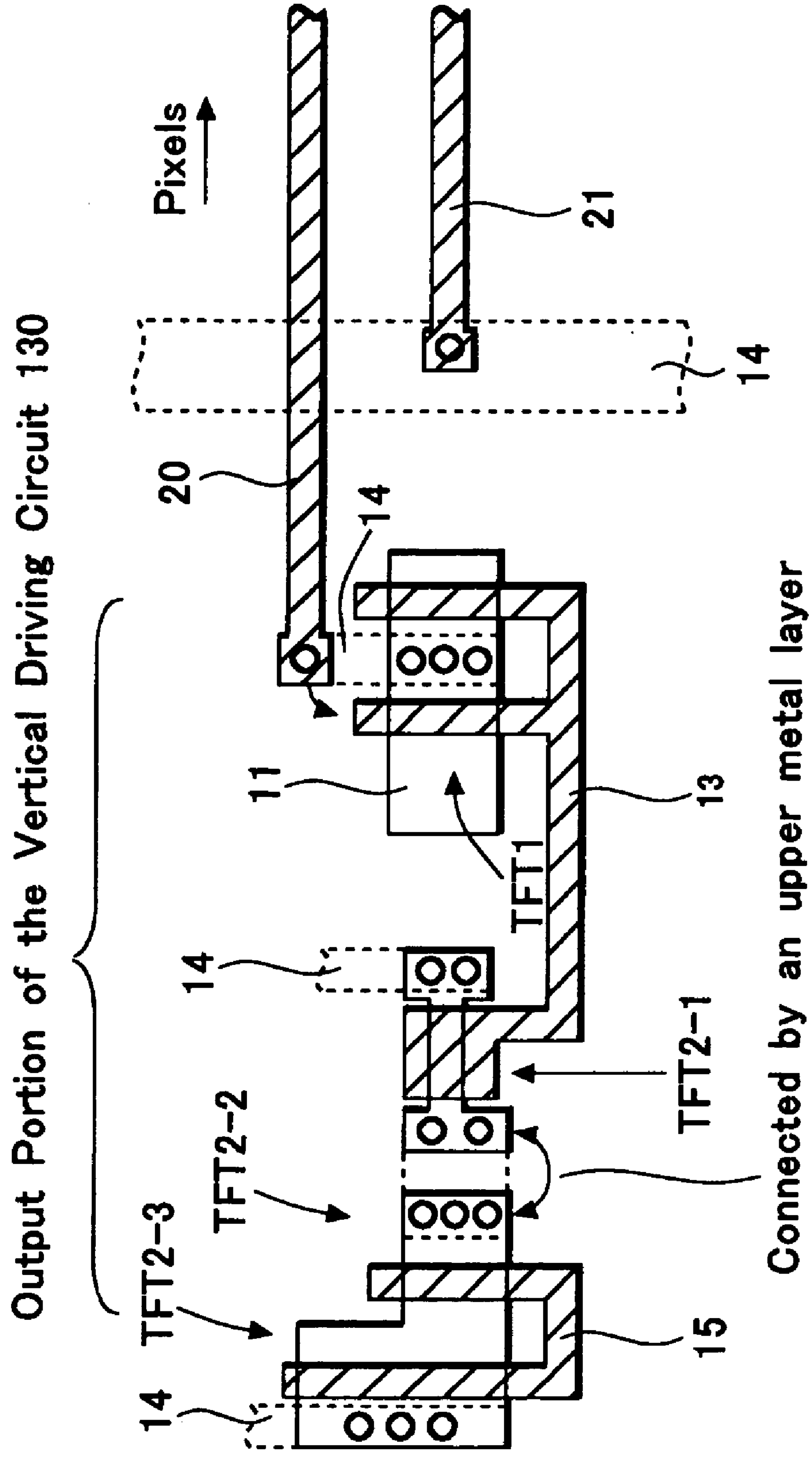
FIG. 8 is a diagram of the output portion of the vertical driving circuit of a liquid crystal display device of a third embodiment of this invention.

In order to prevent the problem described above, the poly-silicon island of the TFT 2-2 is separated, as shown in FIG. 8. Each poly-silicon island is provided with one of the gate wirings 13, 15. The change in the voltage of the gate wirings due to static charge will only influence the poly-silicon island to which each of the gate wirings is connected. The poly-silicon island makes a capacitance coupling only with the gate wiring that is connected to this particular poly-silicon island. Therefore, the break down of the insulating layer is less likely to take place.

The separated poly-silicon islands work in the same way as the circuit shown in FIG. 11 when they are connected by the metal wiring. The configuration, where a plurality of the gate wirings is not connected to a single poly-silicon island, is also effective when the poly-silicon island configures a multi gate transistor.

Figure 6A:
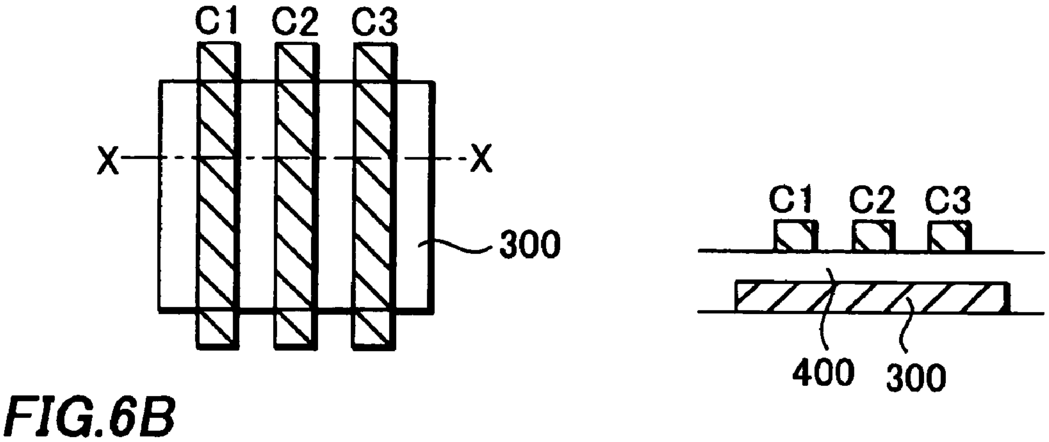
FIGS. 6A, 6B and 6C show examples of the pattern of the input-gate-type thin film transistor as part of the second embodiment.
Figure 6B:
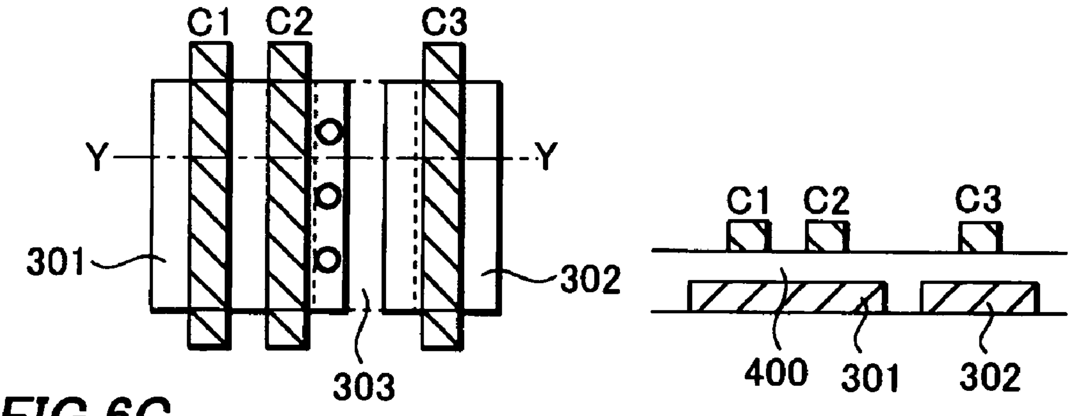
Figure 6C:
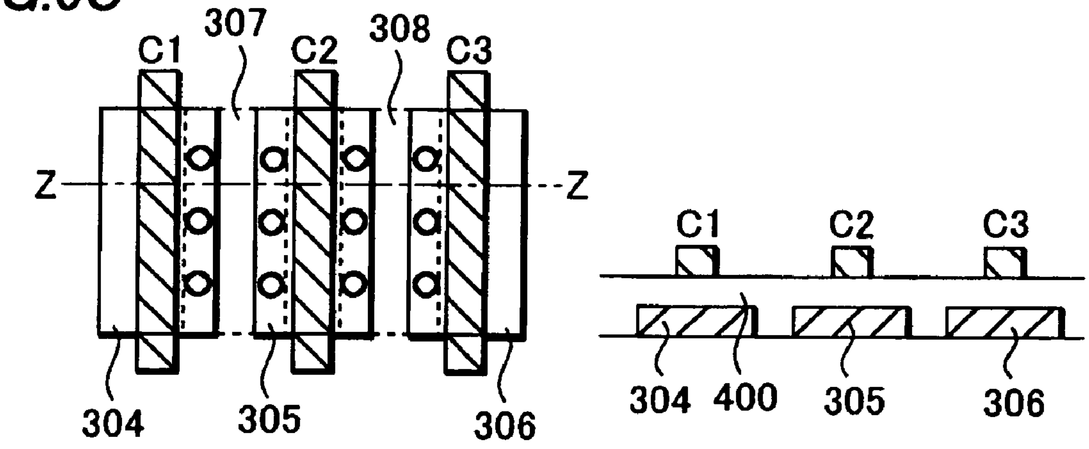

FIGS. 6A, 6B and 6C show pattern examples of the three-input gate type TFT. For example, this corresponds to the N-type TFT of the three-input NAND circuit (TFTs 161, 163 in FIG. 4).

The drawings in left side are the plan views of the pattern, and the drawings in right side shows the cross-sectional views along with the X—X line, Y—Y line and Z—Z line of the plan views respectively. Three different signals C1, C2, and C3 are connected to each of the gate wirings in each pattern.

In the pattern example of FIG. 6A, the three gate wirings are connected to a single poly-silicon island 300. The dielectric break down and the leakage of the gate insulating layer 400 is very likely to take place in this pattern.

In this pattern, there would be a big voltage difference between any two of the three gate wirings during the process when static charge is stored and discharged, causing the dielectric break down. Therefore, this pattern is avoided, by the design rule, in this embodiment. Rather the pattern examples of FIGS. 6B and 6C are employed.

The poly-silicon islands of the three-input TFT are divided into two poly-silicon islands 301 and 302 in the example of FIG. 6B. Two gate wirings extend over the poly-silicon island 301 with the insulating layer 400 between them, and one gate wiring extends over the other poly-silicon island 302 adjacent to the poly-silicon island 301.

Two poly-silicon islands 301 and 302 are connected by the metal wiring 303 in an upper layer during the later manufacturing process, functioning as a single three-way input TFT.

The poly-silicon islands of the three-input TFT are divided into three poly-silicon islands 304, 305, and 306 in the example of FIG. 6C. One gate wiring extends over each of the poly-silicon islands with the insulating layer 400 between them.

The three poly-silicon islands 304, 305 and 306 are connected by metal wirings 307 and 308 in an upper layer during the later manufacturing process, functioning as a single three-way input thin film transistor.

It is preferable to divide the poly-silicon islands of the three-input NAND N-channel type TFT into three, rather than two.

Figure 7B:
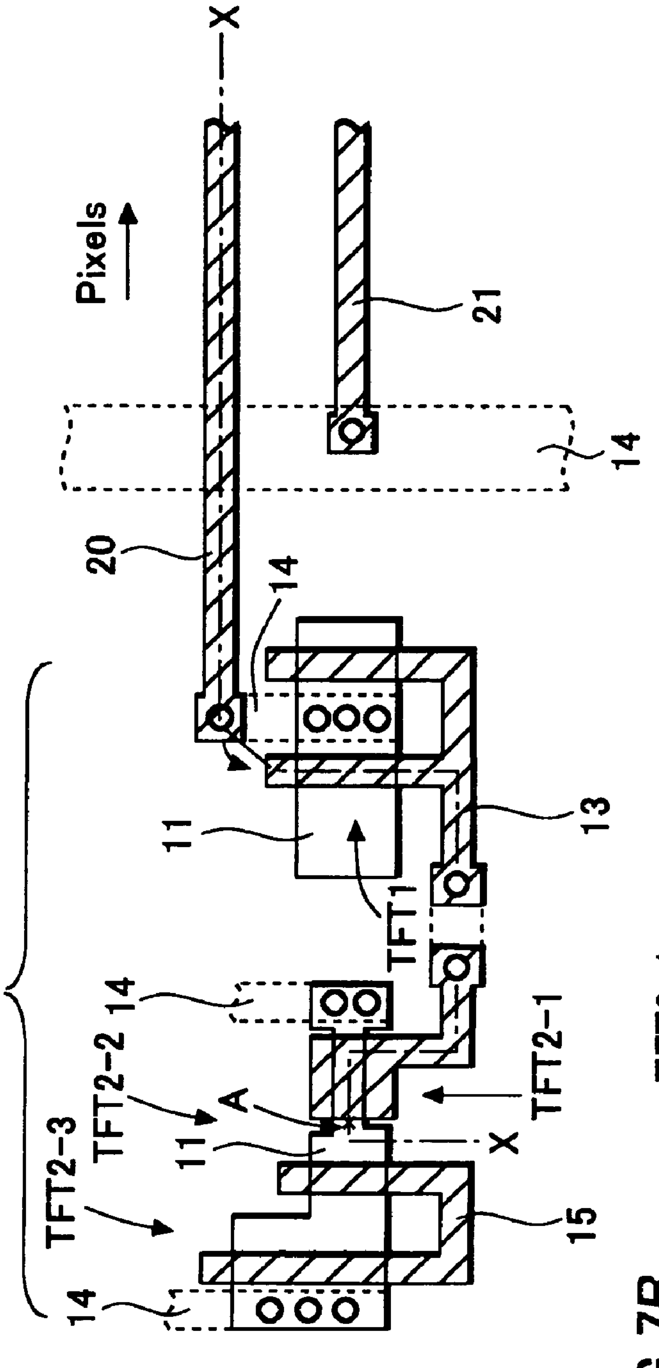
Figure 7B:
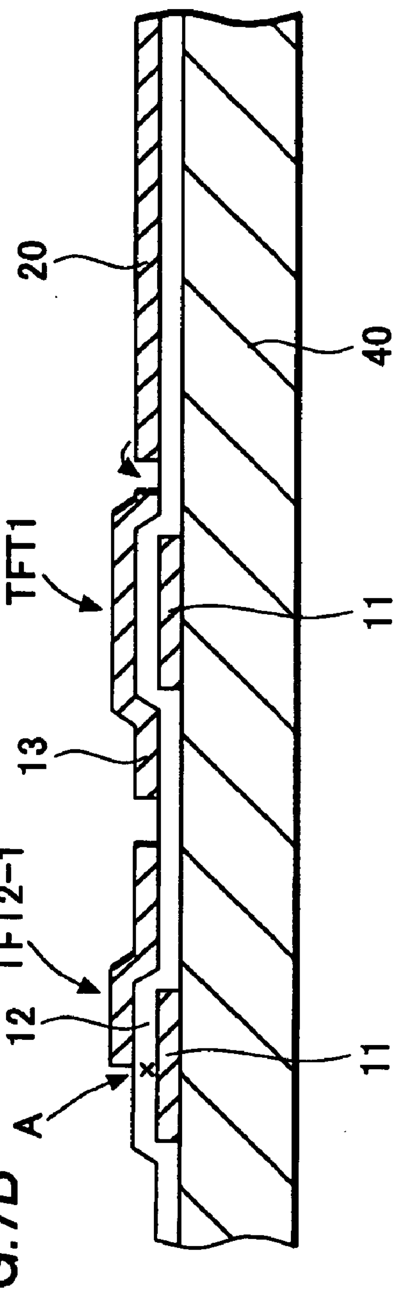
Figure 9:
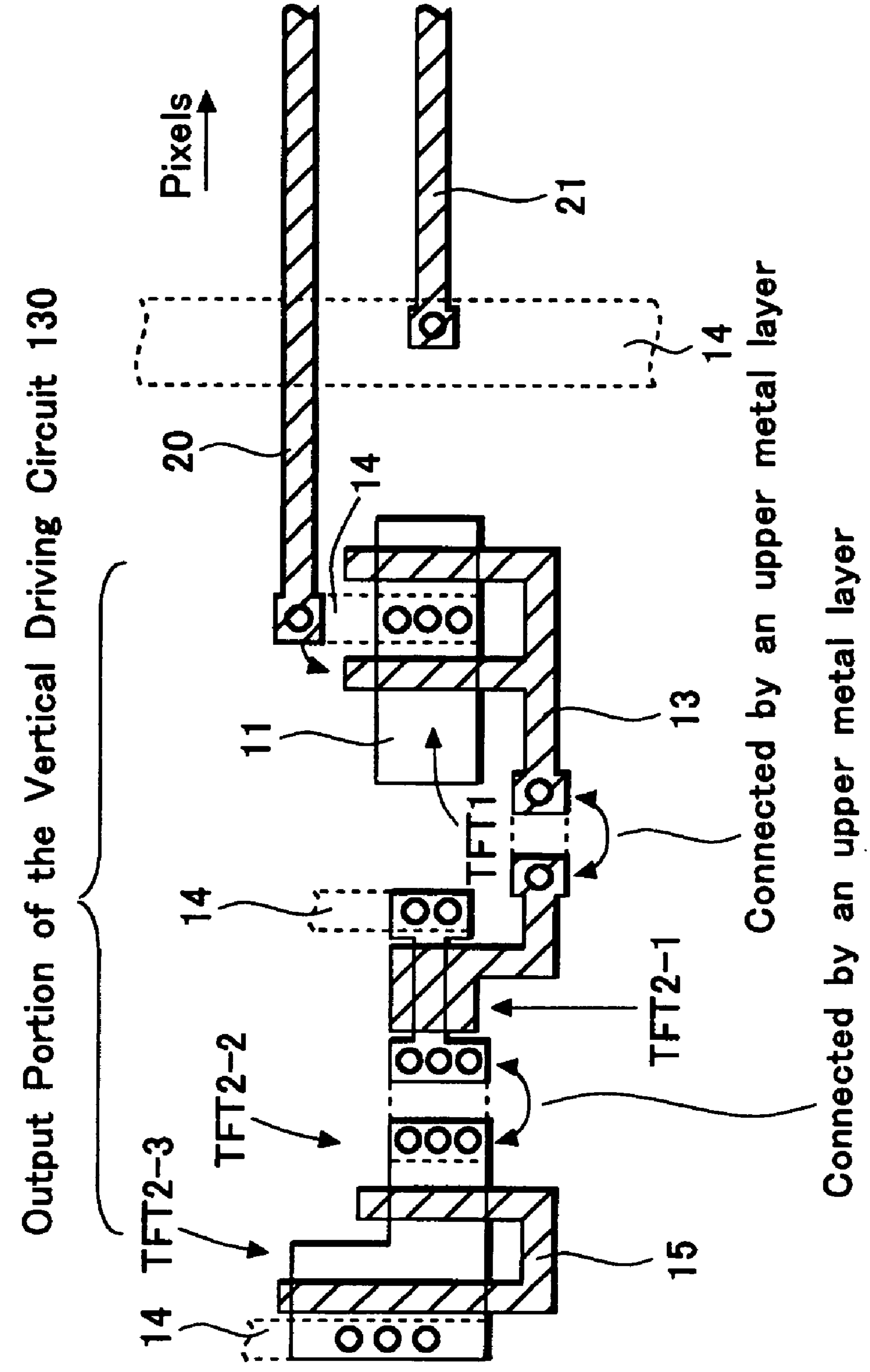
FIG. 9 is a diagram of the output portion of the vertical driving circuit of the liquid crystal display device of the second embodiment.

Also, when the configuration of the gate wiring shown in FIGS. 7A and 7B and the configuration of the poly-silicon island shown in FIG. 8 are combined, one gate wiring is connected to a single poly-silicon island, as shown in FIG. 9.

The explanation has been made on each of the above embodiments by using the liquid crystal display device as an example. However, these embodiments are not limited to this type of device. It can be broadly applied to the device with a gate line and a vertical driving circuit, such as an organic EL display device.

According to this invention, the gate line is severed near the output portion of the vertical driving circuit, and the separated gate lines are connected by the metal wiring in an upper layer. Therefore, the influence of static charge during the manufacturing process can be eliminated, preventing the dielectric break down and the dielectric leakage of the output portion of the TFT.

Additionally, the gate wiring of the TFT of the vertical driving circuit or the horizontal driving circuit is severed, and the separated gate wirings are connected by the metal wiring in an upper layer. Therefore, the amount of static charge stored in the gate wiring can be reduced, preventing the dielectric break down and the dielectric leakage of the TFT.

Also, the gate wiring in the vertical driving circuit is severed in such a way that no single gate wiring is connected to a plurality of the TFTs or the active layers. The separated gate wirings are connected by the metal wiring in an upper layer. Therefore, the dielectric break down and the dielectric leakage of the TFT can be prevented.

The active layer, to which a plurality of the gate wirings are connected, is severed in such a way that no more than two gate wirings extends in the same single active layer, and the separated active layers are connected by the metal wiring in an upper layer. Therefore, the dielectric break down and the dielectric leakage of the multi-gate type TFT can be prevented.

What is claimed is:

1. A display device comprising:

a plurality of pixels disposed in a matrix configuration;

a plurality of gate lines extending in a direction; and a vertical driving circuit supplying a gate scanning signal to the gate lines, each of the pixels being selected according to the gate scanning signal, wherein at least one of the gate lines comprises a first gate line and a second gate line, and a metal wiring is disposed over the first and second gate lines so as to connect the first and second gate lines and is located near an output portion of the vertical driving circuit, and a distance between the metal wiring and a gate wiring in the output portion of the vertical driving circuit is larger than 10 μm.

2. The display device of claim 1, wherein a distance between the first and second gate lines is larger than 10 μm.

3. The display device of claim 1, wherein the metal wiring is made of a material different from a material of which the gate lines are made.

4. A display device comprising:

a plurality of pixels disposed in a matrix configuration;

a plurality of gate lines extending in a direction; and a vertical driving circuit supplying a gate scanning signal to the gate lines, each of the pixels being selected according to the gate scanning signal, wherein at least one of the gate lines comprises a first gate line and a second gate line, and a metal wiring connects the first and second gate lines and is located near an output portion of the vertical driving circuit, and wherein a distance between an edge of the first gate line and a gate wiring in the output portion of the vertical driving circuit is larger than 10 μm, the edge of the first gate line facing the gate wiring in the output portion.

5. The display device of claim 1, wherein the second gate line is connected to the pixels.

6. The display device of claim 1, wherein the gate lines are made of molybdenum, chrome, a molybdenum alloy or a chrome alloy.

7. The display device of claim 1, wherein the metal wiring is made of aluminum or an aluminum alloy.

8. The display device of claim 1, wherein the metal wiring is disposed above the gate lines.

* * * * *